United States Patent Office 2,861,889
Patented Nov. 25, 1958

2,861,889
METHOD OF GLAZING FOODS AND THE RESULTANT PRODUCT

William E. Carman, Nyack, N. Y., assignor to American Maize-Products Company, a corporation of Maine No Drawing. Application January 16, 1956
Serial No. 559,119

7 Claims. (Cl. 99—139)

As is known, certain frozen or canned fruits and vegetables such as sweet potatoes are served in the home with a candy glaze. Many attempts have heretofore been made by the manufacturer to apply such a glaze at the time the food is packaged but these have not proven entirely satisfactory because the sweetening material employed tends to absorb moisture and turn to syrup which either drains into the bottom of the package or is absorbed by the food. In either case the glaze is adversely affected and may be entirely lost.

I have now discovered that when a small amount of precooked starch is added to the sweetening material, moisture is absorbed by the starch and the starch then swells and forms a gel which tenaciously clings to the surface of the packaged food item. The gel is not absorbed by the food and once formed it tends to preserve the natural moisture content of the food and it holds the sweetening material in place on the surface of the food giving a uniform and even candy glaze. The candy glaze made with the sweetening material of my invention is of particular advantage in those cases where the packaged food is heated before it is served because heat causes the starch gel in the glaze to harden and as a result the candy glaze remains in place on the surface of the food which eliminates the basting required with ordinary sweetening materials.

The sweetening material of my invention is best described in connection with the packaging of frozen sweet potatoes but it will be understood that my invention applies equally as well to other vegetables and fruits either frozen or canned.

In accordance with my invention, a dry sweetening mix is formed with sugar, precooked starch and desired flavoring material. The proportion of ingredients may, of course, be varied according to taste but it is important to maintain the starch level high enough so that when the starch absorbs moisture it will form a gel that binds the sugar and flavoring to the surface of the sweet potatoes or other food. For sweet potatoes I have achieved excellent results with a dry sweetening mix comprising 64 parts of dry corn syrup solids, 32 parts commercial brown sugar and 1 part hot-rolled (precooked) pure food powdered starch. Throughout this specification the parts are calculated on a weight basis unless otherwise specified. The specified ingredients were blended and mixed in ordinary mixing equipment and the mix was then poured over precooked sweet potatoes packed in the usual cardboard box. For best results I prefer to use enough sweetening mix to fill up the voids in the box and cover the top surface of the potatoes. For 4 to 6 average size sweet potatoes this requires about 2 to 5 ounces of dry sweetening mix. After the potatoes are covered with sweetening mix they are then subjected to the usual freezing operation.

After a batch of potatoes were well frozen and ready for shipment, a box was opened and the potatoes were found to be nicely glazed and there was no accumulation of frozen sugar syrup in the bottom of the box as ordinarily occurs with the sweetening materials customarily used. The precooked starch had absorbed sufficient moisture during the freezing operation to gel and form a coating on the surface of the potatoes and the sugar which had been incorporated into the gel gave the coating its glazed appearance. Although I do not now know the exact mechanism by which the precooked starch works, I believe that when it absorbs moisture and gels, it forms a structure somewhat like a honeycomb, with the sugars in some way bound up in the interstices of the honeycomb. The consistency of the gel as it forms during the freezing operation is apparently such that it readily adheres to the surface of the potatoes and it is frozen in place thereon. Whatever the true explanation may be, it is a fact that an even glaze had been formed on the frozen potatoes. After opening a box of frozen potatoes, I removed the potatoes from the box and heated them in an oven at about 300° F. The candy glaze hardened and remained in place on the surface of the potatoes, completely eliminating the need for basting.

In the example 1 part of precooked starch was employed with 96 parts of sugar. Other tests were made as described above with different amounts of starch and satisfactory results were achieved with as little as 1 part of starch and as much as 10 parts of starch for 150 parts of sugar. Best results were achieved using from 1½ parts to 6 parts of starch for 150 parts of sugar. With vegetables and fruits which liberate large amounts of water during freezing, it is of course desirable to increase the amount of starch so that the resulting gel will have sufficient body and structure to remain in place on the surface of the fruit or vegetable during the freezing operation. Since the moisture content of different crops varies, it may also be necessary to freeze a few sample packages to determine the exact amount of starch required to achieve the desired glaze.

The term "precooked starch" as used herein is intended to mean edible starch that has been cooked or otherwise treated to the extent that the starch will absorb moisture and swell in cold water.

In the example given hereinabove, the sugar employed was made up of a mixture of dry corn syrup solids and brown sugar. I have used other sugars in place of the dry corn syrup solids and brown sugar with equivalent results. For example, cane and beet sugar, granulated as well as powdered, were substituted in the example for the dry corn syrup solids and brown sugar on an equal weight basis (96 parts by weight) and the glaze produced in all cases was satisfactory. Of course with white sugars it may be desirable to add color and flavoring materials to give the desired appearance and taste and any of the color and flavoring materials ordinarily employed with food products may be used. In the example the brown sugar provides the flavoring and color for the sweetened mix.

In the example I have described the preferred method for forming a permanent glaze on frozen foods. Another way of doing this is to dust the food with precooked starch and then pour the sugar over the food after it has been dusted or rolled in the starch. This eliminates the step of mixing the precooked starch and sugar together and I have found that the amount of starch that clings to the food is enough to bring the proportions of starch and sugar within the desired range when the food is covered with sugar as described in the example set forth hereinabove.

It will be understood that I intend to cover all changes and modifications of the preferred embodiment of my invention herein chosen for the purpose of illustration which do not constitute departures from the spirit and scope of my invention.

What I claim is:

1. A frozen food having a candy glaze in place thereon, said glaze comprising sugar and precooked edible starch in the proportion of about 1 to 10 parts of precooked edible starch for each 150 parts of sugar and in which the precooked starch is in the form of a gel that clings to the surface of the food and binds the sugar in place thereon whereby the sugar and precooked starch glaze substantially remains in place on the food while it is heated and cooked.

2. The method of glazing foods which comprises the steps of mixing precooked edible starch with sugar in the proportion of about 1 to 10 parts of precooked edible starch for each 150 parts of sugar to form a dry sweetening mix, pouring the resulting mixture over an edible food and then freezing the food so that the starch will absorb moisture during the freezing operation and swell to form a gel that clings to the surface of the food and binds sugar in place thereon to form a candy glaze.

3. The method of glazing foods which comprises the steps of dusting food with precooked edible starch, pouring sugar over the food after it is dusted and then freezing the food so that the starch will absorb moisture and swell to form a gel which binds the sugar to the food and forms a candy glaze on the food.

4. The method of forming a candy glaze on frozen foods which comprises the steps of applying dry precooked edible starch and dry sugar to an edible food in the proportion of about 1 to 10 parts of pre-cooked starch for each 150 parts of sugar and then freezing the food whereby the starch may absorb water during the freezing operation and swell to form a gel that clings to the surface of the food to bind the sugar in place thereon and form a candy glaze.

5. A method as specified in claim 2 which includes the step of adding color and flavoring materials to the dry sweetening mix.

6. A candy glaze as specified in claim 1 in which the sugar comprises an admixture of corn syrup solids and brown sugar.

7. An edible food product having a dry sweetening mix in place thereon which comprises a mixture of precooked edible starch and sugar in the proportion of about 1 to 10 parts of precooked edible starch for each 150 parts of sugar and which is characterized by the fact that the dry starch particles absorb moisture from the food product to form a gel which clings tenaciously to the surface of the food and holds the sweetening mix in place thereon while the food is heated and cooked.

References Cited in the file of this patent
UNITED STATES PATENTS

| | | |
|---|---|---|
| 2,359,938 | Peckham | Mar. 5, 1946 |
| 2,406,585 | Buchanan et al. | Aug. 27, 1946 |
| 2,427,594 | Frieden | Sept. 16, 1947 |
| 2,442,928 | McMasters | June 8, 1948 |
| 2,516,891 | Lloyd | Aug. 1, 1950 |
| 2,653,876 | Hanson et al. | Sept. 29, 1953 |